United States Patent Office 3,708,597
Patented Jan. 2, 1973

3,708,597
N-CINNAMYL-4-(3'-HYDROXYPHENYL)-4-PRO-
PIONYL-PIPERIDINE AND SALTS
Herbert Merz, Rheinstrasse 168, Ingelheim am Rhein,
Germany; Kurt Freter, 196 Kenton Ave., Beaconsfield,
Quebec, Canada; and Karl Zeile, Taunusstrasse 11,
Ingelheim am Rhein, Germany
No Drawing. Continuation of application Ser. No.
869,955, Oct. 27, 1969, which is a continuation of
application Ser. No. 744,325, July 12, 1968, which
is a continuation-in-part of application Ser. No.
350,128, Mar. 6, 1964, which in turn is a continu-
ation-in-part of application Ser. No. 177,121, Mar.
5, 1962, all now abandoned. This application Feb.
19, 1971, Ser. No. 117,121
Claims priority, application Germany, Mar. 6, 1961,
P 12 94 381.6-44
Int. Cl. C07d 29/16
U.S. Cl. 260—240 K                                    3 Claims

ABSTRACT OF THE DISCLOSURE

N-cinnamyl-4-(3'-hydroxy-phenyl) - 4 - propionyl-piper-
idine and non-toxic, pharmacologically acceptable acid
addition salts thereof, useful as analgesics in warm-
blooded animals.

---

This application is a continuation of Ser. No. 869,955,
now abandoned, which was filed Oct. 27, 1969, which
application in turn was a continuation of Ser. No. 744,325
filed July 12, 1968, now abandoned, which application
was a continuation-in-part of Ser. No. 350,128 filed Mar.
6, 1964, now abandoned, which in turn was a continua-
tion-in-part of Ser. No. 177,121, filed Mar. 5, 1962, now
abandoned.

This invention relates to N-cinnamyl-4-(3'-hydroxy-
phenyl)-4-propionyl-piperidine and non-toxic, pharmaco-
logically acceptable acid addition salts thereof, as well as
to various methods of preparing these compounds.

More particularly, the present invention relates to
N-cinnamyl-4-(3'-hydroxyphenyl) - 4 - propionyl - piperi-
dine of the formula

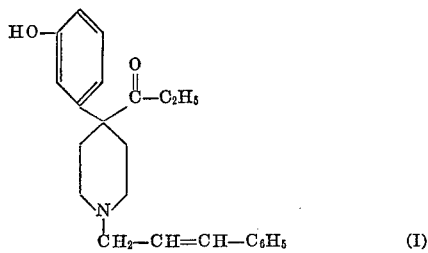

and non-toxic, pharmacologically acceptable acid addition
salts thereof.

The compound of the Formula I according to the pres-
ent invention may be prepared by a number of methods
which are well known in principle. However, the following
methods have proved to be especially advantageous:

Method A: Reaction of 4-(3'-hydroxyphenyl)-4-propi-
onyl-piperidine of the formula

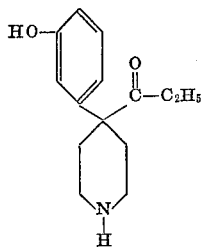

with a cinnamyl halide of the formula

wherein Hal is a halogen, in accordance with the follow-
ing reaction formula:

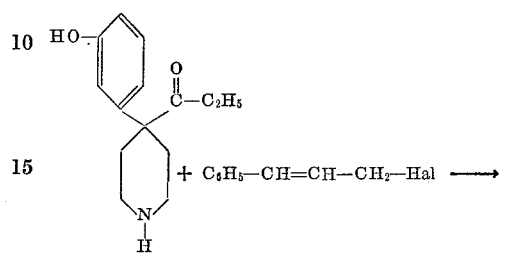

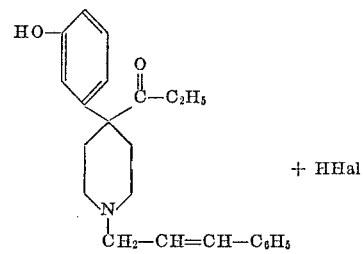

The reaction is preferably performed in the presence of
an inert organic solvent and a weak base, such as sodium
bicarbonate, at temperatures between 50 and 150° C. The
reactants may be provided in a molar ratio of 1:1, but
it is preferred to use the halide IIa in excess over the
stoichiometrically required amount.

Compound II, that is, 4-(3'-hydroxyphenyl)-4-propi-
onyl-piperidine, which is used as one of the starting mate-
rials in this method, may itself be prepared as follows:
A m-alkoxy-benzyl-cyanide of the formula

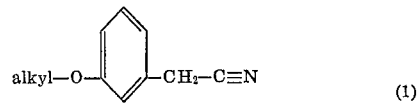

is condensed with a tertiary bis-($\beta$-haloethyl)-p-toluene-
sulfonyl amine of the formula

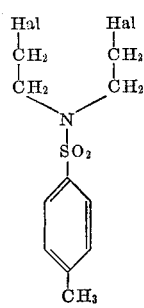

wherein Hal is a halogen, in the presence of a basic condensation agent to form the corresponding 4-cyano-4-derivative of the formula

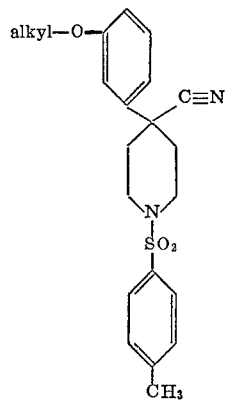

which is then reacted with a Grignard reagent of the formula $$C_2H_5—Mg—Hal \qquad (4)$$

wherein Hal is a halogen, and then with water and ammonium chloride to form the corresponding 4-(3'-alkoxy-phenyl) - 4 - ethylketimine-N-(p-toluenesulfonyl)-piperidine of the formula

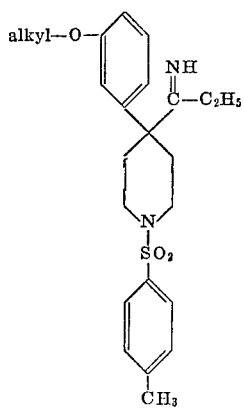

and hydrolyzing this ketimine compound, for example with HBr, to form the desired 4-(3'-hydroxyphenyl)-4-propionylpiperidine (II).

In the reaction of the m-alkoxy-benzyl-cyanide (1) with the bis-(β-haloethyl)-(p - toluenesulfonyl)-amine (2), powdered sodium amide is preferably used as the basic consideration agent and the condensation reaction is most advantageously carried out in the presence of an inert organic solvent, such as toluene, and at a temperature between 50 and 200° C.

The reaction of the 4-(m-alkoxyphenyl)-4-cyano-N-(p-toluenesulfonyl)-piperidine (3) with the Grignard reagent (4) is preferably carried out in the presence of an inert organic solvent, such as benzene, at temperatures between 50 and 100° C. Subsequently, the resulting magnesium-complex compound is decomposed with water in the presence of ammonium chloride.

The hydrolysis of the N-(p-toluenesulfonyl) group, the imino group and the alkoxy group in compound (5) is accomplished in the customary manner and preferably in a single reaction step, for instance by refluxing compound (5) in the presence of a customary ether-splitting agent, such as concentrated hydrogen bromide or hydrogen iodide, and most advantageously in the presence of phenol.

Method B: Reaction of a m-alkoxy-cyanide of the Formula 1 above in the presence of a basic condensation agent with a tertiary bis-(β-halo-ethyl)-amine of the formula

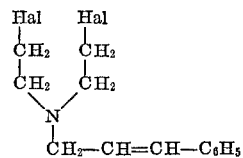

to form the corresponding N-cinnamyl-4-cyano-4-(m-alkoxy-phenyl) piperidine of the formula

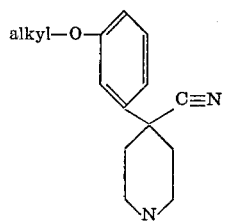

Compound IV is then reacted with a Grignard reagent of the Formula 4 above and with water and ammonium chloride to form the corresponding ketimine compound of the formula

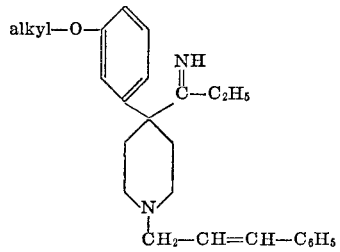

which is then subjected to acid hydrolysis to hydrolize the ketimine group and the alkoxy group and form the desired end product of the Formula I above.

The alkaline condensation reaction between compound I and compound III is preferably carried out in the presence of sodium amide as the basic condensation agent, and in the presence of an inert organic solvent at temperatures between 50 and 200° C. The subsequent Grignard reaction is preferably also performed in the presence of an inert organic solvent, such as benzene, at temperatures between 50° C. and 100° C. The magnesium complex compound formed by the Grignard reaction is then decomposed with water in the presence of ammonium chloride to yield the ketimine. The final acid hydrolysis is carried out under customary conditions.

Method C: Reaction of a 3-(3'-hydroxy-phenyl)-3-propionyl-1,5-dihalo-pentane of the formula

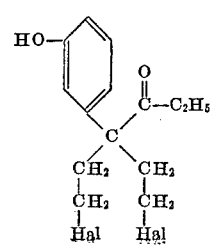

wherein Hal is a halogen, with a primary amine of the formula $$H_2N-CH_2-CH=CH-C_6H_5 \quad (VII)$$

in accordance with the following reaction formula

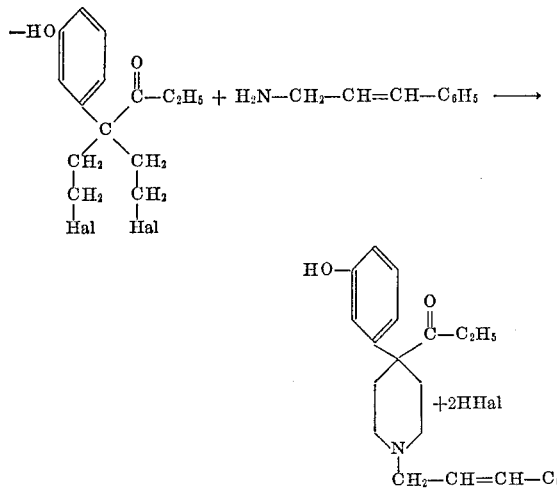

This reaction is performed under customary conditions, that is, preferably in the presence of an inert organic solvent and of a basic condensation agent, such as sodium bicarbonate or dimethylaniline, at temperatures between 50 and 150° C.

The compound of the Formula I above may readily be converted into acid addition salts, especially non-toxic, pharmacologically acceptable acid addition salts, by customary methods, that is, by acidifying the free base with the appropriate acid, preferably in the presence of an inert solvent, such as ethanol. Typical examples of pharmacologically acceptable non-toxic acid addition salts of the present piperidine derivative are those formed with hydrochloric acid, hydrobromic acid, sulfuric acid, phosphoric acid, nitric acid, acetic acid, propionic acid, butyric acid, valeric acid, oxalic acid, malonic acid, succinic acid, maleic acid, fumaric acid, lactic acid, tartaric acid, citric acid, malic acid, benzoic acid, phthalic acid, cinnamic acid, salicylic acid, nicotinic acid, 2-furoic acid, 8-chlorotheophylline and the like.

The following example shall further illustrate the present invention and enable others skilled in the art to understand it more completely. It should be understood, however, that our invention is not limited exclusively to this example.

EXAMPLE 1

Preparation of N-cinnamyl - 4 - (3'-hydroxyphenyl)-4-propionyl-piperidine and its hydrochloride and methanesulfonate by Method A Step a: Preparation of 1-(p-toluene-sulfonyl)-4-(3'-methoxyphenyl) - 4 - cyano-piperidine.—147.0 gm. (1.0 mol) of m-methoxy-benzyl-cyanide and 196 gm. (1.0 mol) of bis-(β-chloroethyl)-(p-toluene-sulfonyl)-amine were dissolved in 1500 cc. of absolute toluene in a 3-liter 3-neck flask provided with a stirrer and a thermometer. Thereafter, while continuously stirring the solution, 83 gm. (2.13 mol) of finely powdered sodium amide were gradually added at 40–45° C. A considerable amount of heat of reaction was evolved during the addition of the sodium amide, so that the flask had to be thoroughly cooled to maintain the desired temperature range. After all of the sodium amide had been added the reaction mixture was refluxed for one hour. Thereafter, the reaction mixture was cooled in an ice water bath, and when the temperature had reached 0–5° C. 120 cc. of water were added dropwise while stirring. Subsequently, an additional 1000 cc. of water were added all at one time while stirring, whereupon the reaction product precipitated out in practically pure, solid form. The precipitate was separated by vacuum filtration, washed with water, suspended in 250 cc. of methanol, again vacuum filtered, washed with 100 cc. of methanol and dried. 240 gm. (65% of theory) of crystalline 1 - (p-toluene-sulfonyl)-4-(3'-methoxyphenyl)-4-cyano-piperidine of the formula

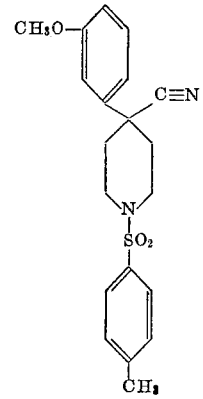

were obtained. The product had a melting point of 167° C.

Step b: Preparation of 4-[1-(p-toluene-sulfonyl)-4-(3'-methoxyphenyl)]-piperidyl-ethyl ketimine.—A Grignard solution was prepared in the customary manner from 374 gm. (2.4 mol) of ethyl iodide and 57.5 gm. (2.4 mol) of magnesium in 750 ml. of ether. The ether was distilled off in an atmosphere of nitrogen, and the residue was dissolved in 750 cc. of absolute benzene. 222 gm. (0.6 mol) of 1-(p-toluene-sulfonyl)-4-(3'-methoxyphenyl)-4-cyanopiperidine (the product obtained in step a) were added to the resulting solution. A virtually homogeneous solution was formed initially, but soon thereafter it became cloudy, accompanied by precipitation of a solid substance. This reaction mixture was then stirred on a water bath at 90° C. for 16 hours in a flask provided with a reflux cooler. The reaction mixture was then cooled on an ice water bath, and the cold reaction mixture was stirred into a mixture of 3.5 kg. of crushed ice and 350 gm. of ammonium chloride. Two liquid phases, that is, a benzene phase and an aqueous phase, formed after a short period of stirring. The benzene phase was separated with the aid of a separating funnel, and the remaining aqueous phase was extracted twice with about 500 cc. of benzene. The benzene extract solutions were combined with the previously separated benzene phase, the combined solution was dried over sodium sulfate, and then the benzene was evaporated in vacuo. About 246 gm. of the ketimine of the formula

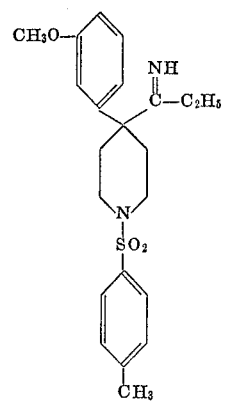

where obtained in the form of a honey-yellow syrup, which crystallized upon standing. This raw ketimine was used for the next step of the synthesis without further purification.

Step c: Preparation of 4-(3'-hydroxyphenyl)-4-propionylpiperidine.—246 gm. of the raw ketimine obtained in step b were refluxed for three hours with 1500 cc. of 48% hydrobromic acid and 246 gm. of phenol. After cooling, 1500 cc. of water were added to the reaction solution, and then the phenol was removed therefrom by extraction with ether. Thereafter, the light brown hydrogen bromide solution was concentrated by evaporation in vacuo, using a rotating evaporator. The evaporation residue was triturated with acetone and the crystalline mass formed thereby was separated by vacuum filtration, washed with acetone and dried. 200 gm. of raw 4-(3'-hydroxyphenyl) - 4 - propionyl-piperidine hydrobromide were then freed from ammonium bromide and transformed into the virtually pure free base in the following manner: The raw product was dissolved in 400 cc. of water, the solution was treated with activated charcoal, filtered and cooled to about 20° C. Thereafter, the solution was admixed with 50 cc. of concentrated aqueous ammonia while stirring, whereupon a solid precipitate formed. The precipitate was separated by vacuum filtration, washed with water and recrystallized from ethanol. 97 gm. (70% of theory) of 4-(3'-hydroxyphenyl)-4-propionyl-piperidine of the formula

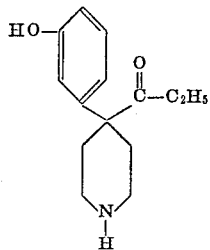

where obtained. The product had a melting point of 222° C.

Step d: Preparation of N-cinnamyl-4-(3'-hydroxyphenyl)-4-propionyl-piperidine and its hydrochloride and methane sulfonate.—0.01 mol of 4-(3'-hydroxyphenyl)-4-propionyl-piperidine (the end product of step c) was refluxed for two hours with 1.26 gm. (0.015 mol) of sodium bicarbonate and 2.15 gm. (0.011 mol) of cinnamyl bromide in the presence of an inert organic solvent mixture consisting of 10 cc. of dimethylformamide and 25 cc. of tetrahydrofuran, accompanied by stirring. Thereafter, the solvent mixture was removed by evaporation, and the residue was washed from the reflux flask into a separating funnel with about 50 cc. of chloroform. Subsequently, the chloroformic mixture was washed three times with 30 cc. portions of water to remove inorganic salt impurities. The chloroform solution which remained was dried over sodium sulfate and was then evaporated in vacuo. The evaporation residue was recrystallized from a mixture of ethanol and ether. N-cinnamyl-4-(3'-hydroxyphenyl)-4-propionyl-piperidine of the formula

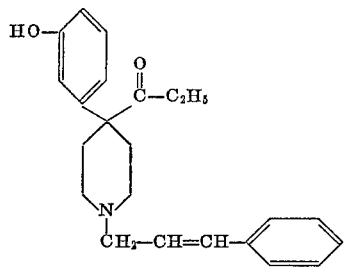

was obtained.

Upon treatment of the free base with ethanolic hydrochloric acid, 2 gm. (51.5% of theory) of the hydrochloride of N-cinnamyl-4-(3' - hydroxyphenyl)-4-propionyl-piperidine were obtained. It had a melting point of 228° C.

Upon treatment of the free base with an equimolar amount of methane-sulfonic acid, the methane-sulfonate of N-cinnamyl-4-(3' - hydroxyphenyl)-4-propionyl-piperidine was obtained. It had a melting point of 185–189° C.

The piperidine compounds according to the present invention, that is, the compound embraced by Formula I above and its non-toxic acid addition salts, have useful pharmacodynamic properties. More particularly, they exhibit strong central analgesic activities in warm-blooded animals, such as mice, and, in addition, are free from physical dependence capacity in rhesus monkeys.

The analgesic activity of the compounds according to the present application was tested on adult white mice by the so-called "hot plate method." Briefly stated, this test procedure involves subcutaneously injecting varying doses of the compound to be tested into a statistically significant number of white mice and, after allowing the analgesic activity to take effect, placing the treated mice on a hot plate maintained at an even temperature of about 55° C. After a certain time interval the animals begin to feel the heat from the hot plate and give way to a natural reflex by licking their paws. The time interval between first contact with the hot plate and the onset of the natural reflex phenomenon is accurately measured with a stop watch and is compared with the corresponding time interval observed on untreated controls. Analgesic activity of the compound being tested manifests itself in a prolongation of the time interval between first contact and onset of the reflex phenomenon over the controls, and this prolongation is a direct measure of the degree of analgesic activity of the compound in question at a given dosage. In the present case, the dosage of the compound in question which prolonged the time interval by 100% over the controls was determined in terms of mgm. per kg. body weight ($ED_{100}$).

The following results were obtained:

N - cinnamyl - 4 - (3' - hydroxyphenyl) - 4 - propionyl-piperidine methanesulfonate—$ED_{100}$=11 mgm./kg.

The tests which established the absence of physical dependence capacity in rhesus monkeys are described by G. A. Deneau and M. M. Seevers in Bulletin, Drug Addiction and Narcotics, volume 25, addendum 2, pp. 1–14, Jan. 29, 1962.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.415 to 1.67 mgm./kg. body weight, preferably 0.83 to 1.0 mgm./kg.

The following examples illustrate a few dosage unit compositions comprising a compound of the instant invention as an active ingredient and represent the best mode contemplated of putting the invention to practical use. The parts are parts by weight unless otherwise specified.

EXAMPLE 2

Hypodermic solution

The solution was compounded from the following ingredients:

| | Parts |
|---|---|
| N - cinnamyl - 4 - (3'-hydroxyphenyl) - 4 - propionyl-piperidine methanesulfonate | 50.0 |
| Hydroxyethyl-theophylline | 70.0 |
| Distilled water, q.s.ad 1.0 parts by vol. | |

Compounding procedure: The piperidine compound and the hydroxyethyl-theophylline were dissolved in the distilled water, and the resulting solution was filled into sterile 1 cc. ampules. Each ampule contained 50 mgm. of the active piperidine compound in solution and, when administered by intramuscular injection to a warm-blooded animal of about 60 kg. body weight in need of such treatment, produced very good analgesic effects.

EXAMPLE 3

Suppositories

The suppository composition was compounded from the following ingredients:

| | Parts |
|---|---|
| N - cinnamyl - 4 - (3'-hydroxyphenyl) - 4 - propionyl-piperidine hydrochloride | 60.0 |
| Lactose | 240.0 |
| Cocoa butter | 1400.0 |
| Total | 1700.0 |

Compounding procedure: The piperidine compound was thoroughly admixed with the lactose, and the resulting mixture was uniformly suspended in the molten cocoa butter. The suspension was then poured into suppository molds of 1700 mgm. capacity and cooled. Each suppository weighed 1700 gm. and contained 60 mgm. of the piperidine compound, and when administered by the rectal route to a warm-blooded animal of about 60 kg. body weight in need of such treatment, produced very good analgesic effects.

EXAMPLE 4

Tablets

The tablet composition was compounded from the following ingredients:

| | Parts |
|---|---|
| N - cinnamyl - 4 - (3' - hydroxyphenyl)-4-propionyl-piperidine methanesulfonate | 60.0 |
| Lactose | 90.0 |
| Corn starch | 40.0 |
| Soluble starch | 5.0 |
| Magnesium stearate | 2.0 |
| Colloidal silicic acid | 3.0 |
| Total | 200.0 |

Compounding procedure: The piperidine compound was admixed with the lactose and the corn starch, and the resulting mixture was moistened with an aqueous solution of the soluble starch. The moist mixture was granulated and dried. The dry granulate was uniformly admixed with the magnesium stearate and the colloidal silicic acid, and the resulting mixture was pressed into tablets weighing 200 mgm. each with the aid of a conventional tablet making machine. Each tablet contained 60 mgm. of the piperidine compound and, when administered perorally to a warm-blooded animal of about 60 kg. body weight in need of such treatment, produced very good analgesic effects.

While we have illustrated our invention with the aid of certain specific embodiments, it will be readily apparent to others skilled in the art that our invention is not limited to these embodiments and that various changes and modifications may be made without departing from the spirit of the invention or the scope of the appended claims.

We claim:

1. N-cinnamyl - 4 - (3'-hydroxyphenyl) - 4 - propionyl-piperidine or a non-toxic, pharmacologically acceptable acid addition salt thereof.

2. A compound of claim 1 which is N-cinnamyl-4-(3'-hydroxyphenyl)-4-propionyl-piperidine methanesulfonate.

3. A compound of claim 1 which is N-cinnamyl-4-(3'-hydroxyphenyl)-4-propionyl-piperidine.

References Cited

UNITED STATES PATENTS

| 2,824,875 | 2/1958 | Elpern | 260—240 X |
| 3,043,844 | 7/1962 | Elpern | 260—240 X |

FOREIGN PATENTS

| 585,898 | 10/1959 | Canada | 260—240 X |

OTHER REFERENCES

Eddy, J. Am. Pharm. Assoc., Sci. Ed., vol. 39, pp. 241–251 (1950).

Deneau et al., Bull. Drug Addiction and Narcotics, vol. 25, addendum 2, pp. 1–7 and 14 (Jan. 29, 1962).

JOHN D. RANDOLPH, Primary Examiner

U.S. Cl. X.R.

260—293.73, 293.8; 424—267